(12) United States Patent
Fischer

(10) Patent No.: US 7,959,389 B2
(45) Date of Patent: Jun. 14, 2011

(54) VEHICLE TIEDOWN SYSTEMS AND METHODS OF USE

(76) Inventor: Paul John Fischer, Jonesville, VA (US)

( * ) Notice: Subject to any disclaimer, the term of this patent is extended or adjusted under 35 U.S.C. 154(b) by 515 days.

(21) Appl. No.: 12/055,008

(22) Filed: Mar. 25, 2008

(65) Prior Publication Data
US 2008/0240881 A1    Oct. 2, 2008

Related U.S. Application Data

(60) Provisional application No. 60/909,430, filed on Mar. 31, 2007, provisional application No. 60/956,592, filed on Aug. 17, 2007.

(51) Int. Cl.
*B60P 7/08* (2006.01)

(52) U.S. Cl. .................... 410/7; 410/9; 410/19; 410/22; 410/30

(58) Field of Classification Search ................ 410/2, 3, 410/4, 7, 9, 10, 11, 12, 19, 20, 22, 23, 30, 410/80; 211/20, 22; 224/403, 404, 42.38, 224/547, 553, 570; 248/500, 503
See application file for complete search history.

(56) References Cited

U.S. PATENT DOCUMENTS

| | | | |
|---|---|---|---|
| 1,733,269 A * | 10/1929 | Mauk et al. ............. | 410/30 |
| 5,593,260 A | 1/1997 | Zimmermann | |
| 5,596,260 A | 1/1997 | Moravec et al. | |
| 6,036,417 A * | 3/2000 | Weaver ................. | 410/7 |
| 6,640,979 B1 * | 11/2003 | Mayfield | |
| 6,805,522 B2 | 10/2004 | Condon | |
| 7,014,398 B1 | 3/2006 | Hellwig | |

OTHER PUBLICATIONS

"http://www.ratchetstrapssuck.com." The Fast Automatic ATV Tie-Down System. Vinny Enterprise, Inc. Up North Outdoors Inc. USA.

* cited by examiner

*Primary Examiner* — Stephen Gordon
(74) *Attorney, Agent, or Firm* — Coats & Bennett, P.L.L.C.

(57) ABSTRACT

Tiedown systems and methods to attach a vehicle to a support floor. The tiedown system may include a wheel cage configured to be attached to the support floor and to receive a wheel of the vehicle. The tiedown system may also include a locking assembly comprising a pivoting lever arm and an engagement member attached to the lever arm. The lever arm may be pivotal between an unlocked position to attach the engagement member to the vehicle, and a locked position that causes the engagement member to exert a force on the vehicle to maintain the wheel of the vehicle in the wheel cage.

12 Claims, 8 Drawing Sheets

VEHICLE TIEDOWN SYSTEMS AND METHODS OF USE

RELATED APPLICATIONS

This application claims priority to and the benefit of U.S. Provisional Patent Application No. 60/909,430 filed Mar. 31, 2007 and U.S. Provisional Patent Application No. 60/956,592 filed Aug. 17, 2007.

BACKGROUND

The present application relates generally to vehicle tiedown systems and, more particularly to an adjustable system that will securely hold a vehicle in a stable position during storage and transport.

When a vehicle, such as but not limited to a three wheel or four wheel all-terrain vehicle, motorcycle, bicycle, automobile, and truck, needs to be transported it should be secured to a support floor, such as a trailer, pickup truck, or other vehicle that is physically capable of the chore. The tiedown should securely hold the vehicle to a support floor, especially if the ride is not entirely smooth. The transported vehicle could potentially roll off of the base or shift during transportation which could cause damage to the vehicle, base, or people. The tiedown may also be applicable to securing a vehicle in storage, such as in a garage, storage facility, and the like.

Previous methods of stabilization include various shortcomings that have not yet been remedied. Straps or chains are often used to secure the vehicles, but these often can tangle or break. They also require extra time in properly attaching them to the vehicle in a manner that will not damage the vehicle. These methods can also be difficult when a person is trying to secure the vehicle by themselves without the assistance of another person.

Therefore, there exists a need for an improved tiedown system.

SUMMARY

The present application is directed to tiedown systems and methods to attach a vehicle to a support floor. The tiedown system may include one or more wheel cages configured to be attached to the support floor and to receive a wheel of the vehicle. The tiedown system may also include a locking assembly comprising a pivoting lever arm and an engagement member attached to the lever arm. The lever arm may be pivotal between an unlocked position to attach the engagement member to the vehicle, and a locked position that causes the engagement member to exert a force on the vehicle to maintain the wheel of the vehicle in the wheel cage.

The various aspects of the various embodiments may be used alone or in any combination, as is desired.

DETAILED DESCRIPTION

Figure 1:
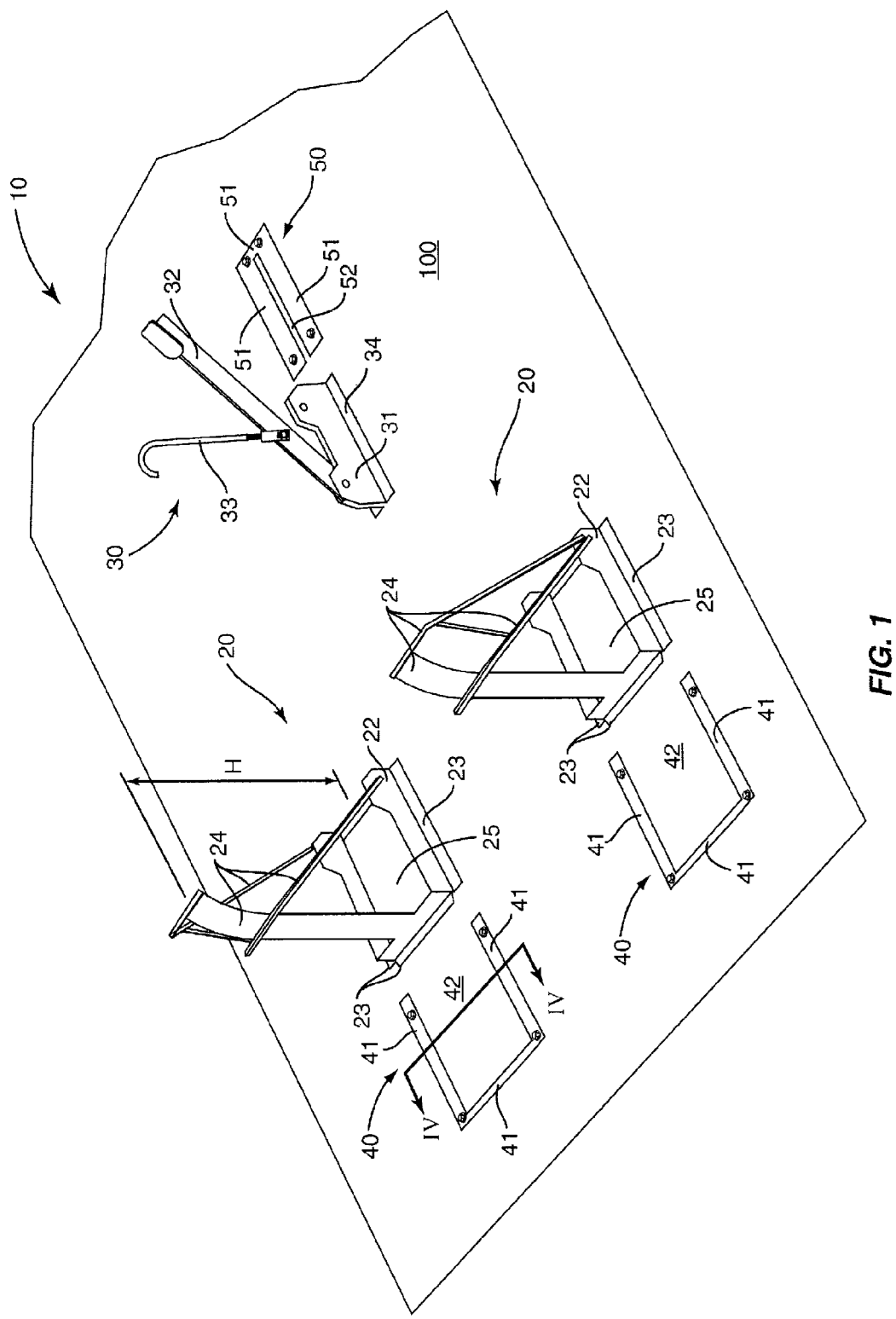
FIG. 1 is an exploded perspective view of a tiedown system according to one embodiment.

The present application is directed to tiedown systems for securing a vehicle. FIG. 1 illustrates an exploded view of one embodiment of a tiedown system 10. The system 10 includes a pair of cages 20 and a locking assembly 30. Each of the cages 20 and locking assembly 30 is secured to a support floor 100. This embodiment may be used for securing a vehicle with two front wheels, such as an all-terrain vehicle. In use, the vehicle is moved onto the support floor 100 with the two front wheels positioned in the cages 20. The locking assembly 30 is then attached to the vehicle and moved to a locked position to apply a force and maintain the wheels in the cages 20. The cages 20 and locking assembly 30 work in combination to secure the vehicle to the support floor 100.

Figure 2:
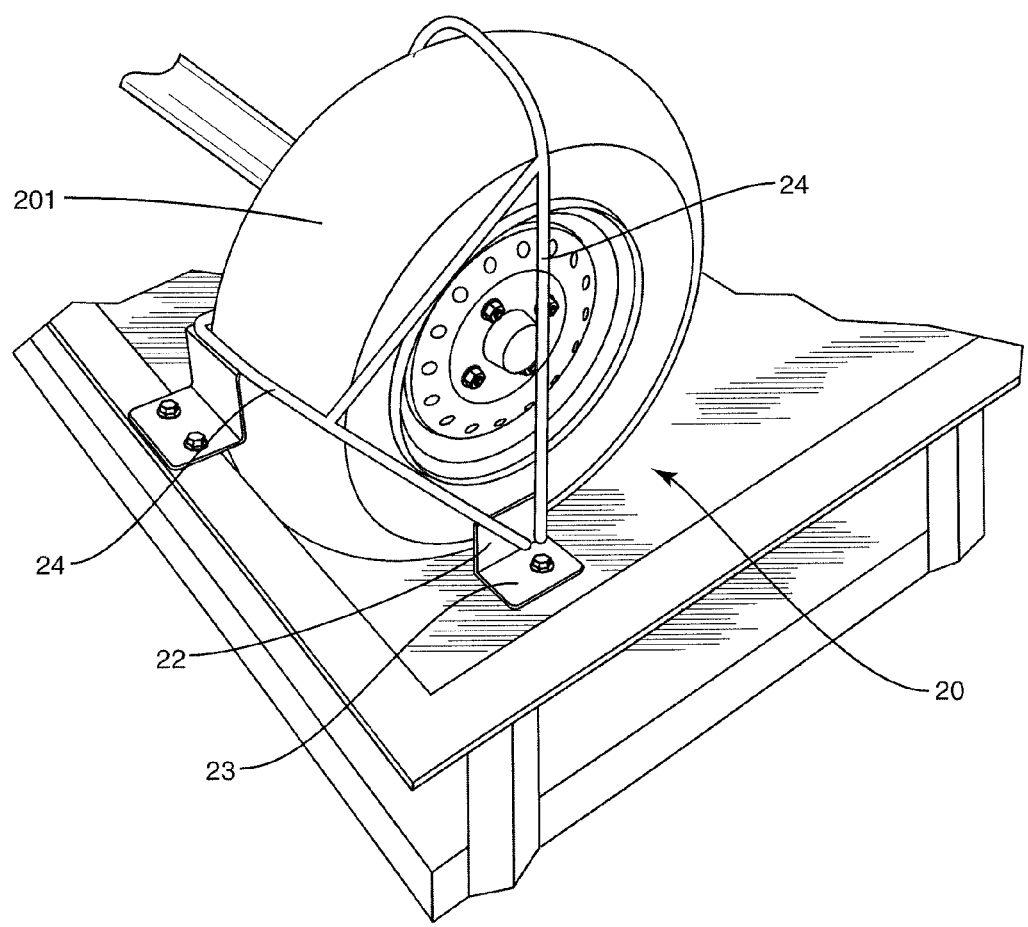
FIG. 2 is a perspective view of a wheel of a vehicle positioned within a cage according to one embodiment.

The cages 20 function to receive the vehicle wheels and provide a stop to prevent movement away from the force when the force is applied through the locking assembly 30. Each cage 20 includes one or more bases 22 and vertical supports 24. In the embodiment of FIG. 1, the cage 20 includes a base 22 with three discrete sections that are attached together and form a space 25 to receive a wheel. FIG. 2 includes an embodiment with the cage 20 including bases 22 that are separated by a space 25 that receives the wheel 201.

The vertical supports 24 extend from the one or more bases 22 and are configured to receive the wheel. The vertical supports 24 may be positioned to extend around one or more sides of the wheel 201. In the embodiments illustrated in FIGS. 1 and 2, the vertical supports 24 are configured to extend around three sides of the wheel 201. In one embodiment, the cage 20 includes a single vertical support 24 to prevent the wheel 201 from moving away from the force of the locking assembly 30. The height H of the cage 20 is adequate to stop the wheel from moving. In one embodiment, the height H is less than the wheel 201. In another embodiment, the height H is greater than the wheel 201 to prevent the wheel 201 from rolling upward and over the cage 20 when the force is applied through the locking assembly 30.

The cage 20 may further include one or more flanges 23 that extend outward from the base 22 to attach the cage 20 to the support floor 100. In one embodiment as illustrated in FIG. 2, the flanges 23 include apertures to receive fasteners to attach the cage 20 to the support floor 100.

Figure 3:
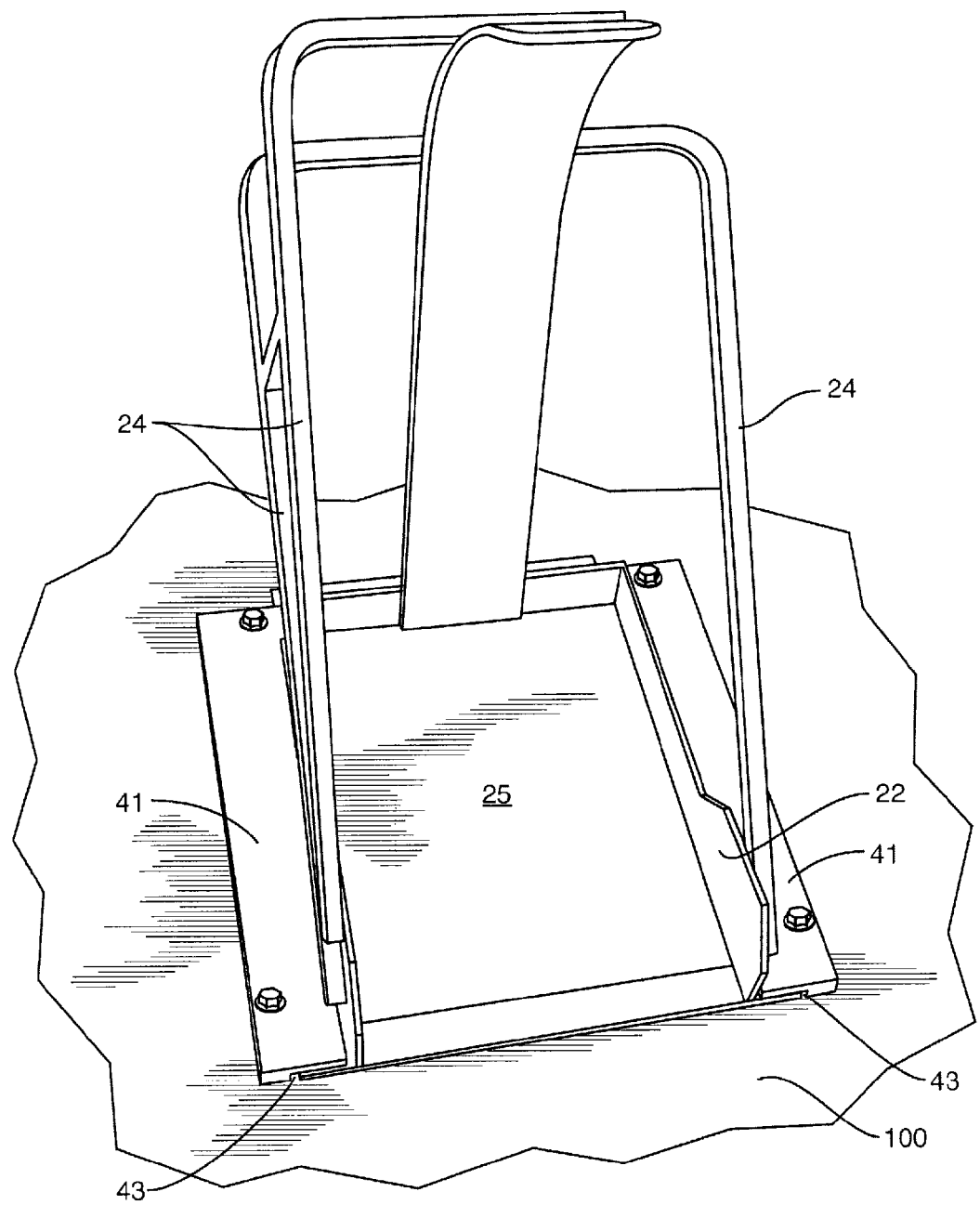
FIG. 3 is a perspective view of a cage mounted in a bracket on the support floor according to one embodiment.

The cage 20 may also be removably attached to the support floor 100 through a bracket 40 that is configured to receive the cage 20 as best illustrated in FIGS. 1 and 3. Bracket 40 may include one or more sections 41 that form a slot 42 sized to receive the cage 20. The sections 41 are constructed to be at least partially spaced above the support floor 100 to form a gap 43 with the support floor 100. The bracket 40 is sized such that the cage 20 may be slid into the slot 42 from one direction with the flanges 23 of the cage 20 being inserted within the gaps 43 and below a portion of the sections 41.

Figure 4:
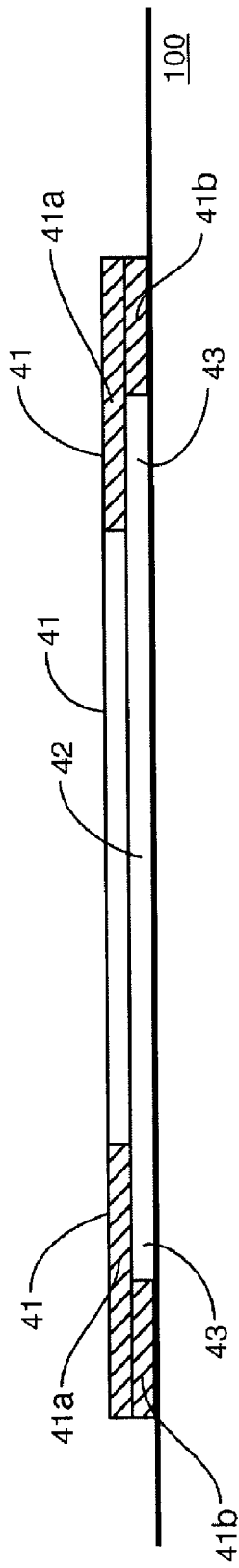
FIG. 4 is a sectional view cut along line IV-IV of FIG. 1 of a bracket according to one embodiment.

In one embodiment as illustrated in FIG. 4, each section 41 is constructed of a two-ply construction that includes an upper wider layer 41a and a lower narrow layer 41b. The lower narrow layer 41b is attached to a bottom side of the wider layer. The upper wider layer 41a extends beyond the lower narrow layer 41b and forms the gap 43 with the support floor 100. The bracket 40 may be attached to the support floor 100 through various methods well known in the art including mechanical fasteners.

Figure 5:
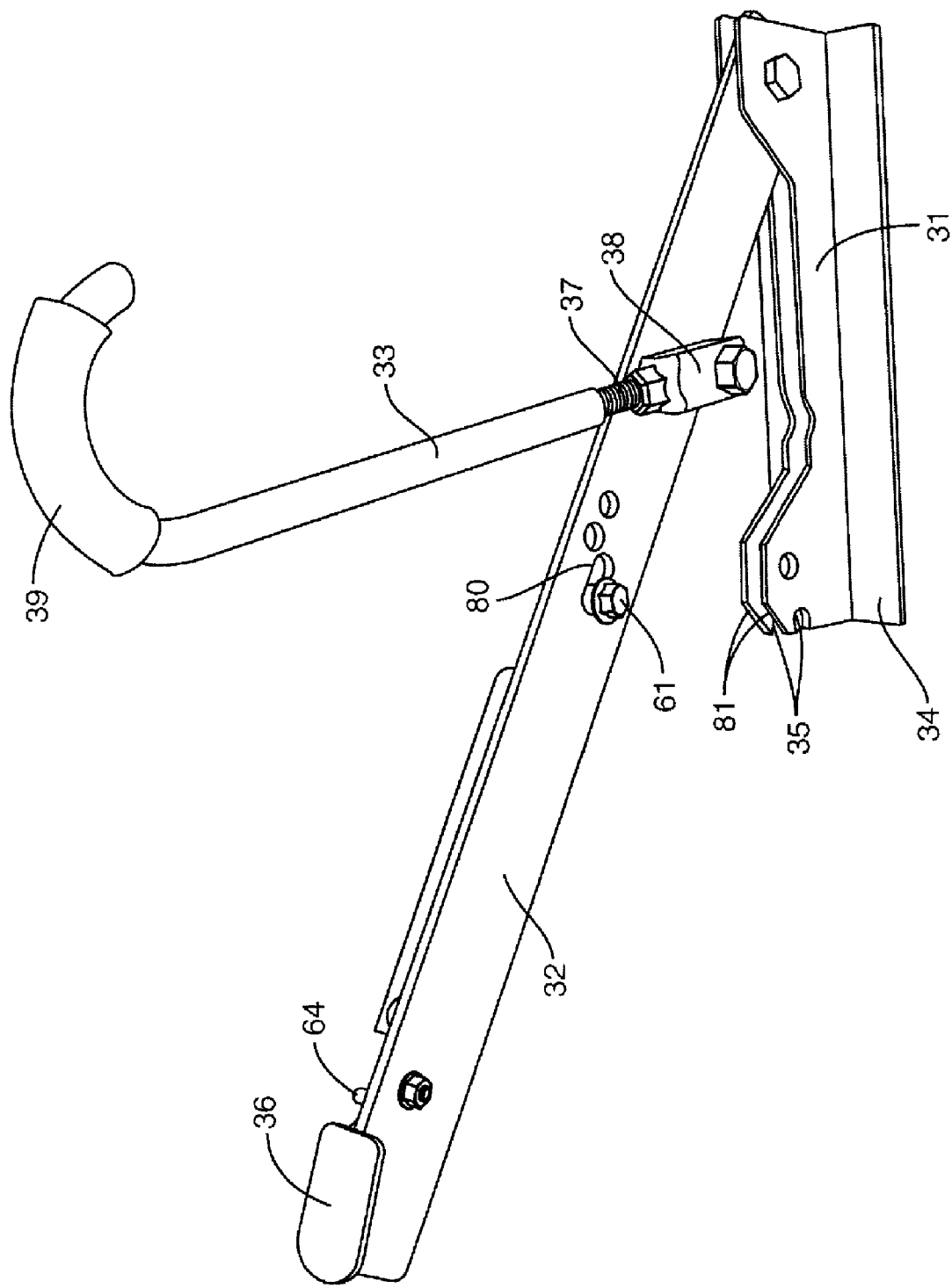
FIG. 5 is a perspective view of a locking assembly according to one embodiment.

The locking assembly 30 attaches to and applies a force to the vehicle 200. FIGS. 1 and 5 illustrate embodiments of the locking assembly 30 that include a base 31, lever arm 32, and an engagement member 33. The base 31 may include one or more flanges 34 that extend outward for attaching the locking assembly 30 to the support floor 100. Flanges 34 may include apertures to receive mechanical fasteners for directly connecting the locking assembly 30 to the support floor 100. In another embodiment, the flanges 34 engage with a bracket 50 to be removably attached to the support floor 100 as will be explained below. In one embodiment, the base 31 is constructed from two substantially identical L-shaped pieces that are spaced apart a distance to form a gap that receives the lever arm 32.

Figure 6:
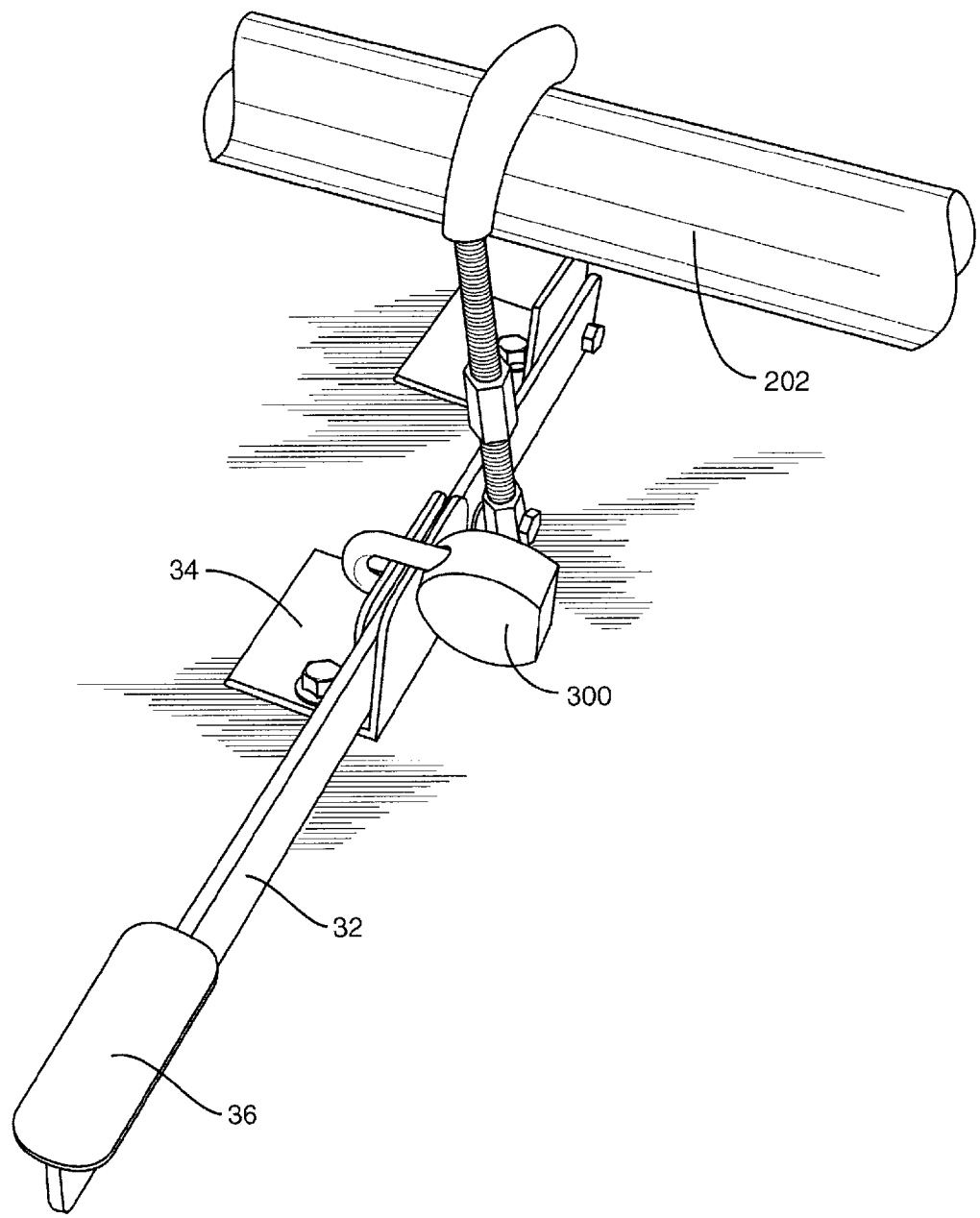
FIG. 6 is a perspective view of a locking assembly attached to a vehicle according to one embodiment.

The lever arm 32 includes an elongated shape with a first end attached to the base 31, and an opposite second end that may include an enlarged pedal 36 to accommodate the user as will be explained below. The lever arm 32 is movable between an unlocked position with the lever arm 32 pivoted away from the base 31 as illustrated in FIG. 5, and a locked position at the base 31 as illustrated in FIG. 6. The lever arm 32 and base 31 may include one or more apertures that align when the lever arm 32 is in the locked position to receive a lock 300 to maintain the lever arm 32 in the locked position as illustrated in FIG. 6.

Engagement member 33 includes an elongated shape with a first end 39 configured to attach to the vehicle 200 and a second end attached to the lever arm 32. In one embodiment, the first end includes a curved hook shape to extend around a portion of the vehicle 200. FIG. 6 illustrates an embodiment with the first end 39 shaped to extend around an axle 202 of the vehicle 200. It should be understood that the first end 39 may include a variety of shapes to attach to the vehicle 200. Further, the first end 39 may be equipped with other features to attach to the vehicle. Examples include but are not limited to a threaded section that engages a threaded counterpart on the vehicle, and an aperture that receives a fastener that attaches to the vehicle 200. In one embodiment, the second end is threaded to connect to a threaded receptacle 38 on the lever arm 32. The threaded connection of the second end provides for rotating the engagement member 33 relative to the receptacle 38 to adjust an effective length of the engagement member 33 to accommodate vehicles 200 of different sizes. In one embodiment, the receptacle 38 is pivotally attached to the lever arm 32 to adjust the angle formed between the engagement member 33 and the lever arm 32. In another embodiment, the second end of the engagement member 33 includes an aperture to receive a fastener to directly connect the engagement member to the lever arm 32.

The locking assembly 30 may be directly connected to the support floor 100 by mechanical fasteners that extend through the flanges 34 as illustrated in FIG. 6. In another embodiment as illustrated in FIG. 1, the locking assembly 30 is attached to the support floor 100 by a bracket 50. Bracket 50 may include one or more sections 51 that form a slot 52 sized to receive the base 31 of the locking assembly 30. The sections 51 are constructed to be at least partially spaced above the support floor 100 to form a gap with the support floor 100. The bracket 50 is sized such that the base 31 may be slid into the slot 52 of the bracket 50 from one direction. In one embodiment, each section 51 is constructed of a two-ply construction as discussed above for the wheel cage brackets 40.

Figure 7:
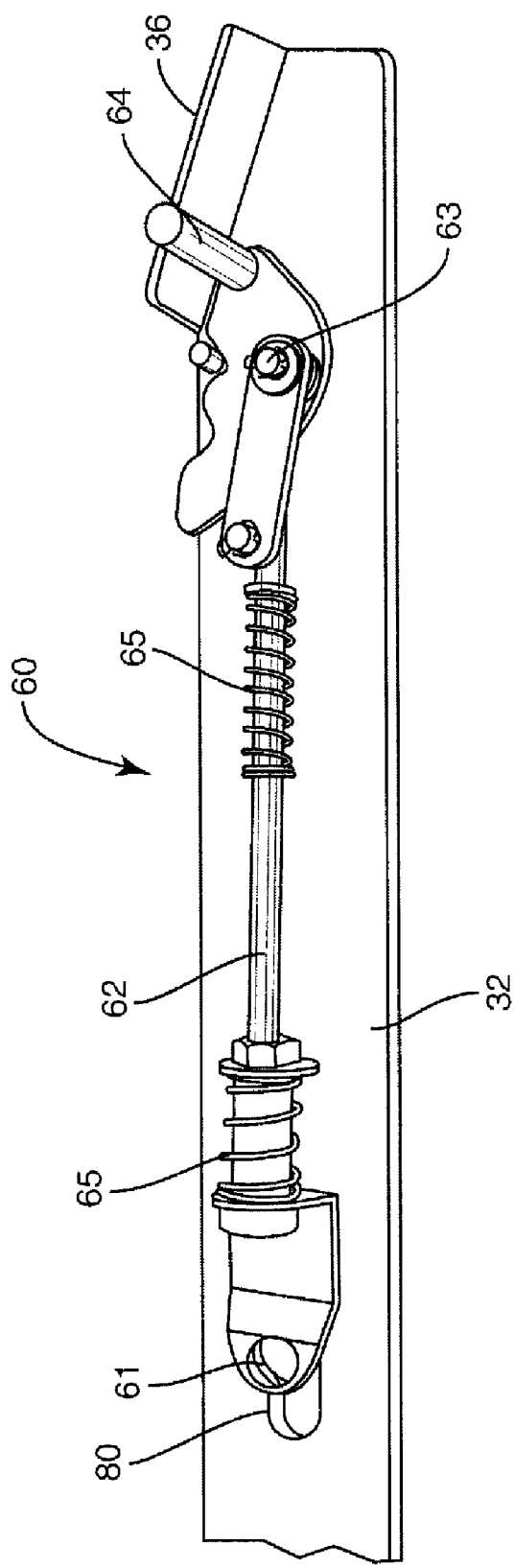
FIG. 7 is a perspective view of a locking mechanism of a locking assembly according to one embodiment.

A locking mechanism 60 may be attached to the lever arm 32 to maintain the locking assembly 30 in the locked position. FIG. 7 illustrates one embodiment of the locking mechanism 60 that includes a pin 61 positioned in an elongated slot 80 in the lever arm 32. The locking mechanism 60 also includes an arm 62 pivotally attached to a cam 63 and one or more biasing members 65. In use, with the locking assembly 30 in the unlocked position, the locking mechanism 60 is placed in a first position with the pin 61 extending outward along the slot 80 away from the cam 63. As the lever arm 32 is pivoted towards the locked position, the pin 61 contacts against an angled surface 81 on the base (see FIG. 5). This contact moves the pin 61 inward towards the cam 63 as the force applied to the pin 61 is greater than the force applied by the biasing members 65. As the lever arm 32 pivots downward to the locked position, the slot 80 aligns with a notch 35 in the base 31 (see FIG. 5). Once aligned, the biasing members 65 bias the pin 61 outward along the slot 80 away from the cam 63 and into the notch 35. This maintains the lever arm 32 in the locked position. To move the lever arm 32 towards the unlocked position, the user grabs a knob 64 on the cam 63 and rotates the cam 63 to move the arm 62 and pin 61 along the slot 80 and out of the notch 35.

Figure 8:
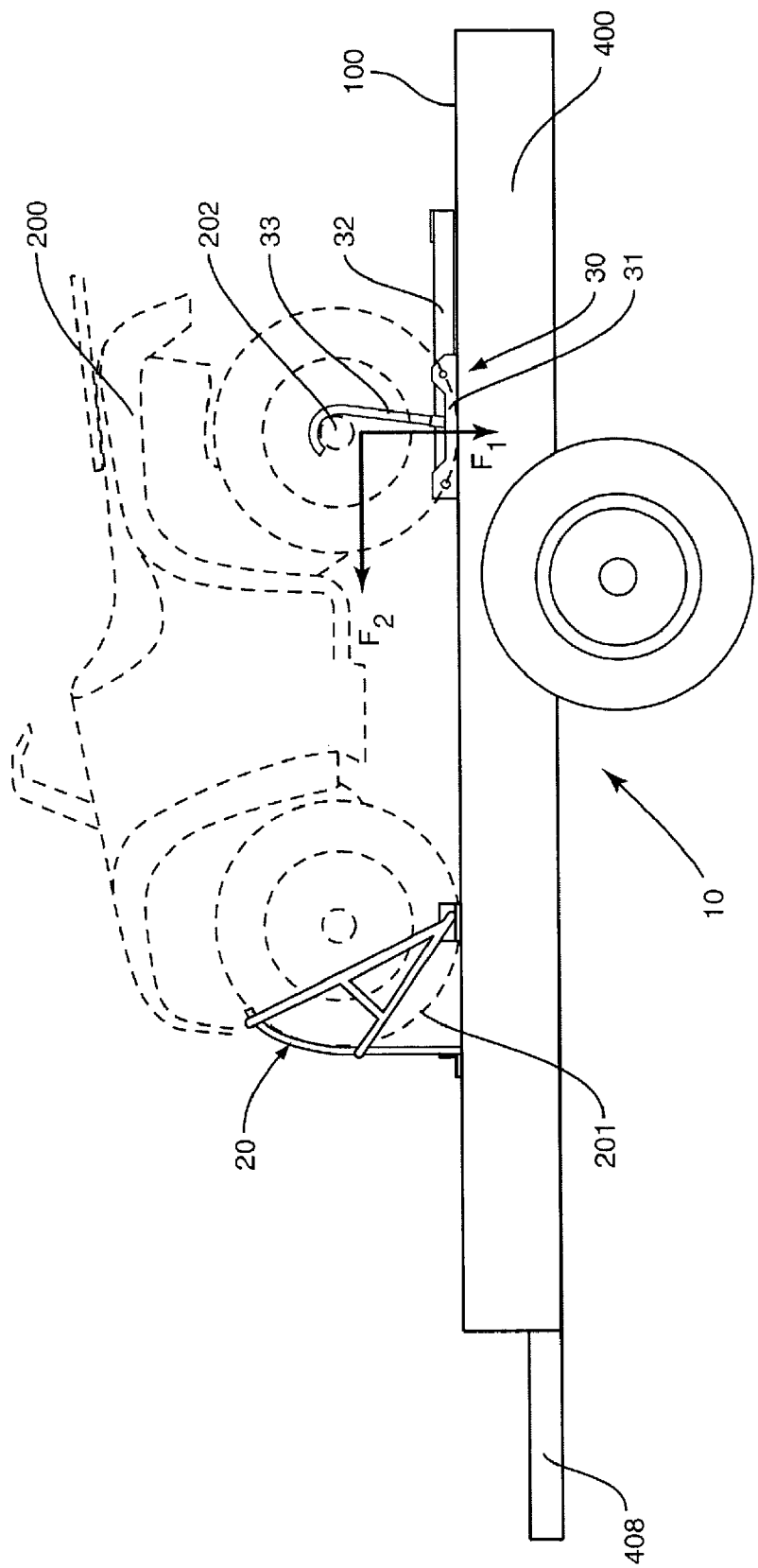
FIG. 8 is a schematic view of a tiedown system securing a vehicle to a support floor according to one embodiment.

FIG. 8 illustrates one use of the tiedown system 10 for securing a vehicle 200 to a support floor 100 formed by a trailer 400. In this embodiment, one or more cages 20 are positioned to receive the front wheels 201 of the vehicle 200. The locking assembly 30 is positioned with the lever arm 32 in the unlocked position such that the engagement member 33 can attach to the vehicle 200 at an attachment point. In this embodiment, the attachment point is a rear axle 202 of the vehicle 200. The lever arm 32 is then pivoted downward to the locked position that causes the engagement member 33 to move towards the support floor 100. In one embodiment, this occurs by the user stepping on the pedal 36 on the lever arm 32. This downward movement of the lever arm 32 pulls the engagement member 33 thus applying a force to the vehicle 200 that maintains the wheels 201 in the cages 20 and the vehicle 200 secured to the support floor 100.

In the embodiment illustrated in FIG. 8, the force applied by the locking assembly 30 includes both a downward component F1 and a forward component F2 that together maintains the wheel 201 within the cage 20, and also maintains the vehicle 200 against the support floor 100. This force also causes the cages 20 to remain attached with the brackets 40 and the locking assembly 30 to remain attached with the bracket 50. Specifically, the force causes the cages 20 to be pushed towards the back of slots 42. Further, when the back of the bracket 50 is positioned in front of the attachment point on the vehicle 200, the force causes the bracket to be pushed towards the back of slot 52.

The relative positions of the cages 20 and locking assembly 30 may vary depending upon the context of use. In the embodiment of FIG. 8, the locking assembly 30 is positioned to engage a rear axle 202 of the vehicle 200 and apply a force to push the wheels 201 into the cages 20. That is, with the vehicle 200 facing forward towards a tongue 408 of the trailer 400, the cages 20 are positioned in front of the locking assembly 30. In another embodiment, the locking assembly 30 is positioned to engage a front section of the vehicle 200 and apply a force to pull the wheels 201 into the cages 20. In this embodiment, the locking assembly 30 is positioned towards a front of the trailer 400 towards the tongue 408. This embodiment may include a number of different configurations, including but not limited to the locking assembly 30 engaged with a front axle of the vehicle 200 and the cages 20 receiving the rear wheels, and the locking assembly 30 engaged to the front axle and the cages 20 receiving the front wheels 201. Therefore, various positions of the cages 20 and locking assembly 30 are to be considered.

In one embodiment, the tiedown system 10 includes two or more cages 20 and the locking assembly 30. The cages 20 may receive the front wheels, back wheels, or combination of wheels. In another embodiment, the system 10 includes a single cage 20 in combination with the locking assembly 30.

In one embodiment as illustrated in FIG. 1 that uses two cages 20, the locking assembly 30 is positioned between the cages 20. In other embodiments, the locking assembly 30 is aligned with one of the cages, or positioned offset from between the cages 20.

The tiedown system 10 may be used to secure a variety of vehicles 200, including but not limited to three and four wheel all-terrain vehicles, motorcycles, bicycles, cars, trucks, trailers and campers. The vehicles 200 may include one or more wheels 201.

The support floor 100 may include a variety of embodiments, including but not limited to a trailer, truck bed, garage floor, and storage facility floor.

Spatially relative terms such as "under", "below", "lower", "over", "upper", "front", "rear", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. In one embodiment, the brackets 40, 50 are U-shaped. The present embodiments are, therefore, to be considered in all respects as illustrative and not restrictive, and all changes coming within the meaning and equivalency range of the appended claims are intended to be embraced therein.

What is claimed is:

1. A tiedown system to attach a vehicle to a support floor, the tiedown system comprising:
   a wheel cage configured to be attached to the support floor and to receive a wheel of the vehicle; and
   a locking assembly separate from the wheel cage, comprising a base configured to be attached to the support floor at a separate location than the wheel cage, a lever arm pivotally attached to the base, and an engagement member attached to the lever arm and arranged such that the engagement member exerts a force on the vehicle to maintain the wheel of the vehicle in the wheel cage when the lever arm is in a locked position;
   wherein a first angle between the lever arm and the base in an unlocked position is greater than a second angle between the lever arm and the base in the locked position;
   wherein the lever arm includes a first end pivotally attached to the base, a second end opposite from the first end, and an interior section positioned between the first and second ends, the interior section being in an overlapping arrangement with the base when the lever arm is in the locked position and being spaced away from the base when the lever arm is in an unlocked position.

2. The tiedown system of claim 1, wherein the engagement member is pivotally attached to the lever arm between the first and second ends.

3. The tiedown system of claim 1, wherein the lever arm further comprises a locking mechanism with a pin that moves along a longitudinal axis of the lever arm such that the pin engages the base when the lever arm is in the locked position to maintain the lever arm in the locked position and moves along the longitudinal axis away from the base to allow the lever arm to be pivoted to an unlocked position.

4. The tiedown system of claim 1, wherein the engagement member includes an elongated shape with a hooked end configured to attach to the vehicle when the lever arm is in the locked position.

5. The tiedown system of claim 1, further comprising a U-shaped locking assembly bracket that attaches to the support floor and includes a slot sized to receive the base of the locking assembly such that the base and the locking assembly bracket are positioned in an overlapping arrangement that attaches the locking assembly to the support floor.

6. The tiedown system of claim 5, further comprising a U-shaped wheel cage bracket that attaches to the support floor and includes a wheel cage bracket slot sized to receive the wheel cage such that the wheel cage and the wheel cage bracket are positioned in an overlapping arrangement that attaches the wheel cage to the support floor.

7. The tiedown system of claim 6, wherein the slots of the locking assembly bracket and the wheel cage bracket each include openings that face towards each other when the brackets are attached to the support floor.

8. The tiedown system of claim 1, further comprising a second wheel cage attached to the support floor and configured to receive a second wheel of the vehicle.

9. A tiedown system to attach a vehicle to a support floor, the tiedown system comprising:
   a wheel cage configured to be attached to the support floor and to receive a wheel of the vehicle; and
   a locking assembly configured to be attached to the support floor at a separate location than the wheel cage, the locking assembly including a base, a pivoting lever arm with a first end attached to the base and an opposing second end, and an elongated engagement member that extends outward from the lever arm at a point that is closer to the first end than the second end, the locking assembly movable between an unlocked position to be operatively connected to the vehicle and a locked position to exert a force on the vehicle to maintain the wheel in the wheel cage;
   wherein a first distance between the second end and the support floor in the unlocked position is greater than a second distance between the second end and the support floor in the locked position.

10. The tiedown system of claim 9, further comprising a wheel cage bracket to attach the wheel cage to the support floor and a locking assembly bracket to attach the locking assembly to the support floor, the wheel cage bracket and locking assembly bracket each including a two-ply construction to each form a gap when attached to the support floor.

11. The tiedown system of claim 10, wherein one of the wheel cage bracket and the locking assembly bracket including a slot that includes a cross-sectional shape with a narrow upper section positioned away from the support floor and a wider lower section positioned at the support floor.

12. The tiedown system of claim 9, wherein the engagement member includes a first end pivotally attached to the lever arm and a second end with a hook sized to attach with the vehicle.

* * * * *